United States Patent [19]
Von Benken

[11] Patent Number: 5,284,011
[45] Date of Patent: Feb. 8, 1994

[54] DAMPED TURBINE ENGINE FRAME

[75] Inventor: John D. Von Benken, Cincinnati, Ohio

[73] Assignee: General Electric Company, Cincinnati, Ohio

[21] Appl. No.: 990,384

[22] Filed: Dec. 14, 1992

[51] Int. Cl.⁵ .................. F02C 7/20; F01D 25/06
[52] U.S. Cl. .................. 60/39.31; 415/119; 248/554
[58] Field of Search .............. 60/39.31, 39.32; 415/119; 416/500; 244/54; 248/554, 556, 557

[56] References Cited

U.S. PATENT DOCUMENTS

| | | | |
|---|---|---|---|
| 2,582,397 | 1/1952 | Schwartz et al. | 188/1 |
| 2,676,674 | 4/1954 | Hodgson et al. | 188/1 |
| 3,034,597 | 5/1962 | Arnold et al. | 188/1 |
| 4,329,119 | 5/1982 | Baskin | 416/500 |
| 4,484,859 | 11/1984 | Pask et al. | 416/500 |
| 4,987,736 | 1/1991 | Ciokajlo et al. | 60/39.31 |
| 5,056,738 | 10/1991 | Mercer et al. | 244/54 |
| 5,087,491 | 2/1992 | Barrett | 428/34.5 |

OTHER PUBLICATIONS

I. E. Treager, "Aircraft Gas Turbine Engine Technology," 1979, pp. i, ii, and 527-530.
U.S. patent application Ser. No. 07/813,547 entitled "Viscoelastic Vibration Damper for Engine Struts" filed Dec. 26, 1991 by Dennis W. Watson.

*Primary Examiner*—Louis J. Casaregola
*Attorney, Agent, or Firm*—Jerome C. Squillaro; Nathan D. Herkamp

[57] ABSTRACT

A frame for a gas turbine engine includes an outer casing, an inner hub, and a plurality of circumferentially spaced apart struts extending radially therebetween. Each strut includes first and second sidewalls defining a radial passage therein, and an elongate damper is disposed in respective ones of the strut passages. Each damper is disposed in an interference fit laterally between the first and second sidewalls for maintaining contact therewith for effecting sliding friction to dampen vibration of the struts.

9 Claims, 4 Drawing Sheets

5,284,011

DAMPED TURBINE ENGINE FRAME

The United States Government has rights in this invention pursuant to Contract Number F33657-83-C-0281 between the U.S. Air Force and the General Electric Company.

The present invention relates generally to gas turbine engines, and more specifically, to shaft-supporting frames thereof.

BACKGROUND OF THE INVENTION

A gas turbine engine includes one or more rotor shafts which are suitably supported by annular frames. In one exemplary engine, a fan is joined to a fan shaft which is supported at its forward end in a fan frame. The fan frame includes an outer casing, an inner hub, and a plurality of circumferentially spaced apart struts extending therebetween. The hub supports a bearing for the rotating fan shaft, with the loads therefrom being channeled through the hub and struts into the outer casing. The struts are airfoil shaped since inlet air to the engine first passes between the adjacent struts prior to reaching the fan.

The struts are typically hollow members for reducing weight of the engine while also providing passages through which conduits may be disposed for carrying air or oil, for example, through the struts. Since the struts are hollow and support the rotating fan shaft and allow airflow between adjacent struts, they are subject to excitation forces from the rotating fan shaft and from the air which may cause vibration thereof. Where the natural frequencies of the frame approach the excitation frequencies from the rotating fan, conventionally known as (per)/rev frequencies, and from the inlet airflow, fundamental flexural and torsional modes of vibration, as well as panel modes of vibration may be excited in the individual struts.

It is conventional to either design the frame to provide a suitable margin between the excitation frequencies and the natural resonance frequencies of the frame, or to provide suitable damping material for damping any vibrations which may result. For example, the hollow passages through the struts may be conventionally filled with a damping compound such as rubber for damping vibration of the struts themselves as well as damping vibration of the conduits therein. However, improved frame damping is desired especially where the frames are being made lighter in weight which decreases the margin between the excitation forces and the natural resonance frequencies thereof.

SUMMARY OF THE INVENTION

A frame for a gas turbine engine includes an outer casing, an inner hub, and a plurality of circumferentially spaced apart struts extending radially therebetween. Each strut includes first and second sidewalls defining a radial passage therein, and an elongate damper is disposed in respective ones of the strut passages. Each damper is disposed in an interference fit laterally between the first and second sidewalls for maintaining contact therewith for effecting sliding friction to dampen vibration of the struts.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
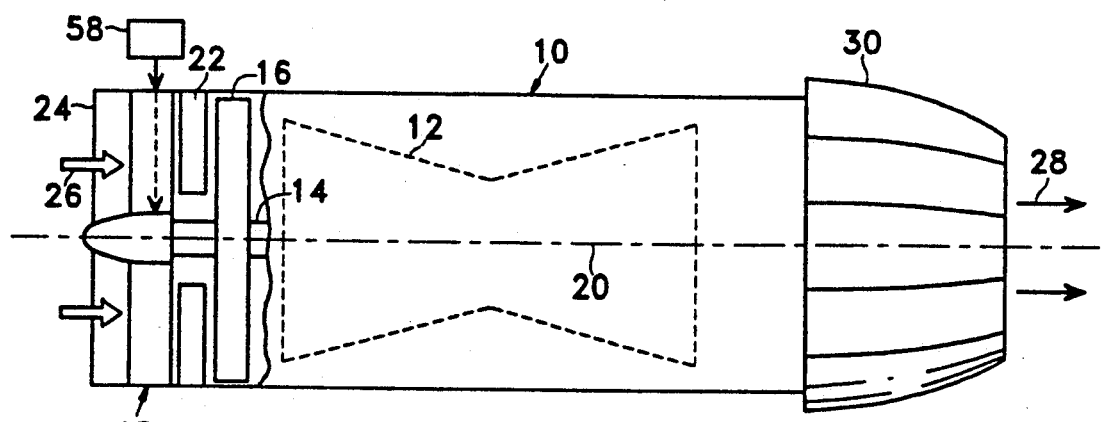
FIG. 1 is a schematic representation of an exemplary gas turbine engine in longitudinal section illustrating a frame in accordance with one embodiment of the present invention for supporting a fan shaft.

Illustrated schematically in FIG. 1 is an exemplary augmented, turbofan gas turbine engine 10 for powering an aircraft in flight. The engine 10 includes a conventional core engine 12, including compressor, combustor, and turbine, which rotates a fan shaft 14 from which extends a conventional fan 16. The forward end of the fan shaft 14 is supported by conventional bearings in a fan or front frame 18 in accordance with one embodiment of the present invention. The engine 10 includes a longitudinal centerline axis 20 about which the frame 18 is coaxially disposed, and conventional variable inlet guide vanes (VIGV's) 22 are disposed axially between the frame 18 and the fan 16 as is conventionally known.

The engine 10 includes an inlet 24 for receiving ambient airflow 26 which is channeled through the frame 18 and VIGV's 22 and through the fan 16. A portion of the airflow 26 is conventionally channeled through the core engine 12 wherein it is mixed with fuel and ignited for generating combustion gases 28 from which energy is extracted for rotating the fan shaft 14 and in turn the fan 16, with the combustion gases 28 being discharged from the engine through a conventional variable area exhaust nozzle 30.

Figure 2:
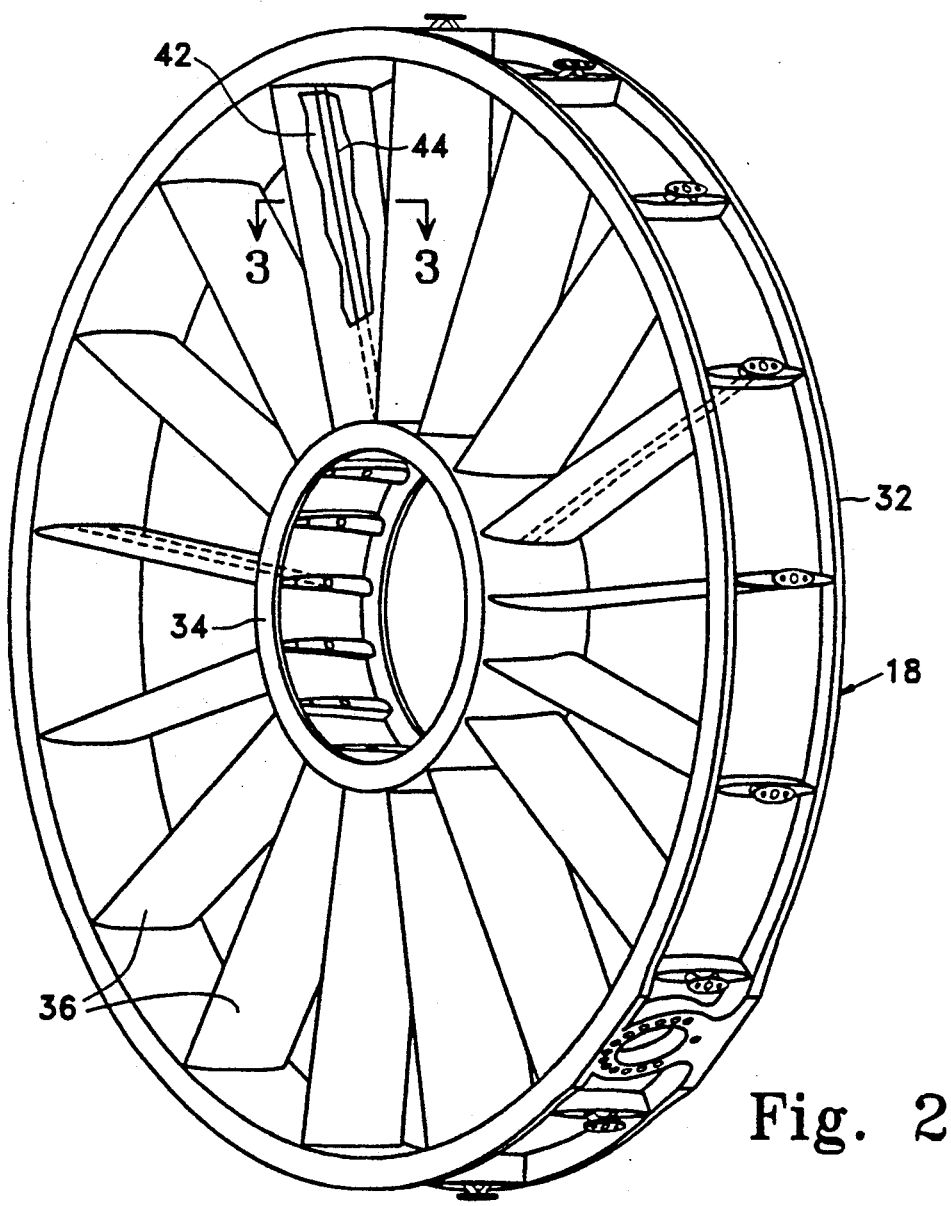
FIG. 2 is a perspective view of the front frame illustrated in FIG. 1 removed from the engine.

The front frame 18 removed from the engine 10 is illustrated in more particularity in FIG. 2 and includes an annular, radially outer casing 32 which is conventionally joined in the engine 10; and annular, radially inner hub 34 spaced radially inwardly from the outer casing 32; and a plurality of circumferentially spaced apart frame vanes or struts 36 which extend radially between the casing 32 and the hub 34. The outer and inner ends of the struts 36 are conventionally fixedly joined to the casing 32 and the hub 34.

Figure 3:
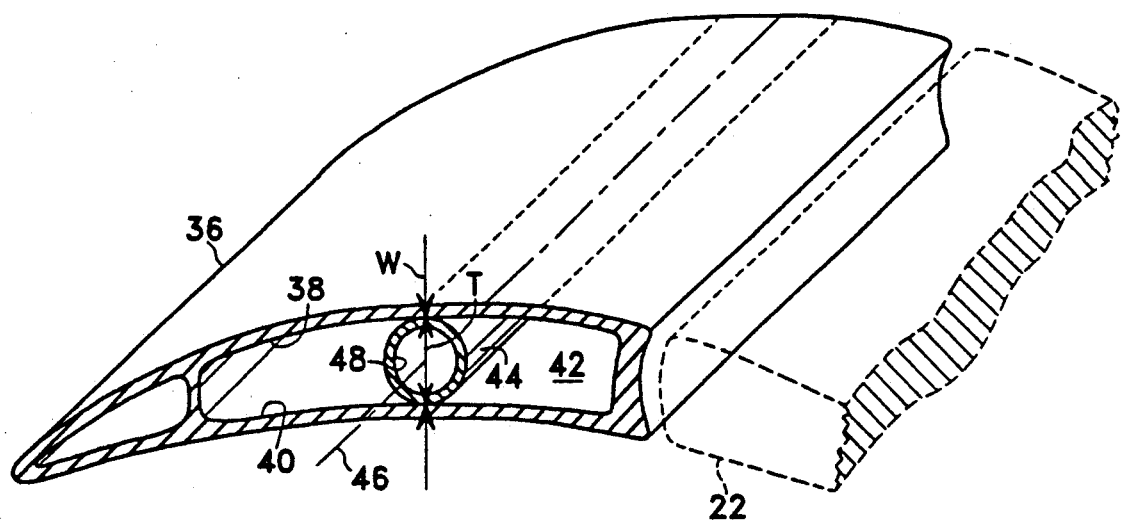
FIG. 3 is a partly sectional view of a portion of one of the frame struts illustrated in FIG. 2 taken generally along line 3—3 showing a damper in accordance with a first embodiment of the present invention.

FIG. 3 illustrates a portion of an exemplary one of the frame struts 36, with each strut 36 being hollow and having circumferentially spaced apart first and second sidewalls 38 and 40, respectively, defining a strut passage 42 extending radially between the casing 32 and the hub 34 for the full radial extent of the strut 36 as shown in FIG. 2. In accordance with the present invention, the frame 18 further includes a plurality of elongate damper members, or simply dampers, 44, with each damper 44 being disposed in a respective one of the strut passages 42. As additionally shown in FIG. 2, each damper 44 extends radially between the casing 32 and the hub 34 preferably for the full radial extent of each strut 36. Each damper 44 is preferably disposed in a conventional interference fit laterally, or circumferentially, between the strut first and second sidewalls 38 and 40 as shown in FIG. 3 for maintaining contact therewith for effecting sliding friction to dampen vibration of the struts 36.

Figure 4:
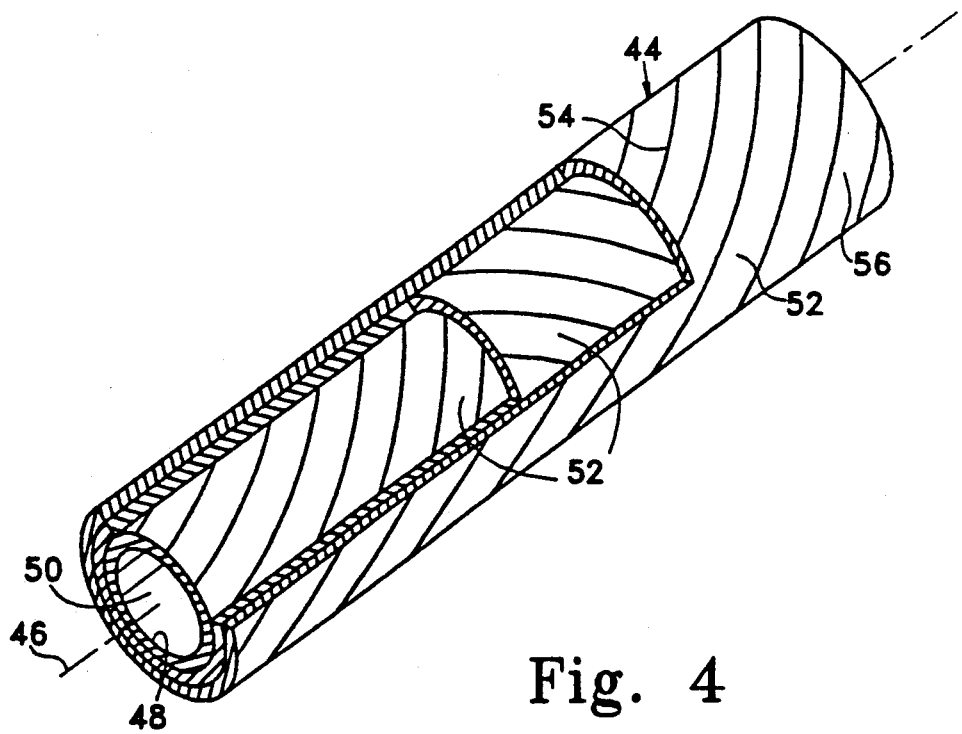
FIG. 4 is a perspective view, partly cut away, of the damper illustrated in FIG. 3.

More specifically, each damper 44 has a longitudinal centerline axis 46 which is disposed generally parallel to a radial axis of the frame 18 as shown in FIG. 2, and contacts the first and second sidewalls 38, 40 along at least two lines of contact extending substantially parallel to the damper centerline axis 46 as shown in FIG. 3. The damper 44 is illustrated in FIGS. 3 and 4 in accordance with a first embodiment wherein the damper 44 is configured in the form of a tube 48 having an internal tubular passage 50. In the preferred embodiment of the invention, the damper 44 is a non-metal, preferably composite member which may be elastically compressed in an interference fit inside the strut passage 42 for damping vibration of the strut 36. In one exemplary embodiment as illustrated in FIG. 4, the damper 44 includes a plurality of concentric plies or layers 52, three being shown, of structural fibers 54 joined together in a bonding matrix 56. The fibers 54 provide structural strength, in the hoop stress direction for example, and may be formed of conventional material such as carbon or graphite fibers in braided form such as that identified by the T-300 designation and available from the Amoco Company. The matrix 56 is also conventional for suitably containing the fibers 54 and may be made from a polyimide resin such as that known under the PMR 15 designation.

The tubular form of the damper 44 provides inherent elasticity which, when compressed in an interference fit inside the strut passage 42, maintains two lines of contact with the opposing strut sidewalls 38, 40 for providing sliding friction damping of the strut 36. This tubular configuration of the damper 44 also allows the damper 44 to provide the additional function of a flow conduit for air or oil, for example, to be channeled through the struts 36 from or to conventional components 58 as shown in FIG. 1. Since the damper 44 itself provides the internal passage 50 for flow therethrough of fluids such as oil or air, separate conduits therefor are not required. Furthermore, since the damper 44 contacts the strut first and second sides 38, 40, additional damping material such as rubber compounds need not be injected into the strut passage 42 for providing damping as is conventionally done. And, vibration of the damper 44 itself is also dampened by its contact with the sidewalls 38, 40.

In the embodiment of the damper 44 illustrated in FIGS. 3 and 4, the damper 44 is cylindrical which results in the two lines of contact along the strut first and second sidewalls 38, 40. The damper 44 may take other suitable configurations as desired for providing at least damping of the struts 36, as well as providing a flow carrying function through the internal passage 50 if desired.

As shown in FIG. 3, the damper 44 has a maximum thickness T, and the width of the strut passage 42 between the sidewalls 38, 40 is designated W, with the initial value of the damper thickness T being suitably larger than the passage width W so that when the damper 44 is inserted through the passage 42 it is partially compressed to create an interference fit with the sidewalls 38, 40 generally along two opposing lines of contact. Since the damper 44 is preferably composite, and not metal, it may be readily pulled through the strut passage 42 into suitable position therein in the interference fit.

Figure 5:
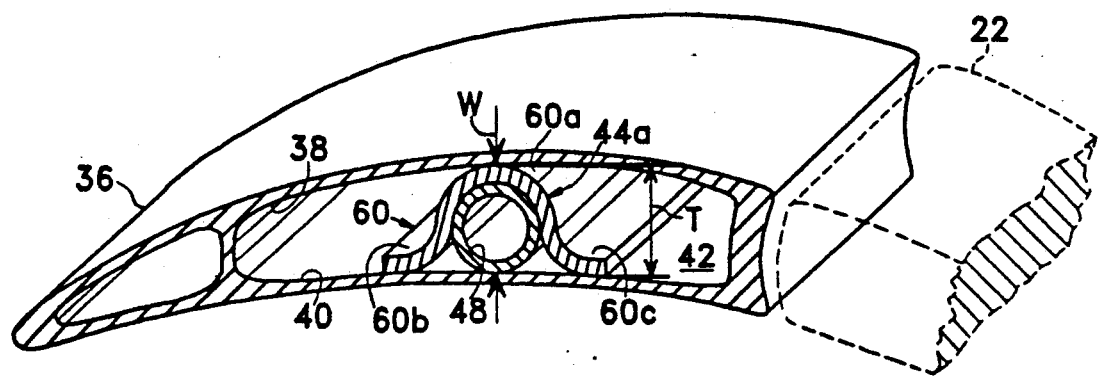
FIG. 5 is a partly sectional view similar to FIG. 3 illustrating a damper in a frame strut in accordance with a second embodiment of the present invention.
Figure 6:
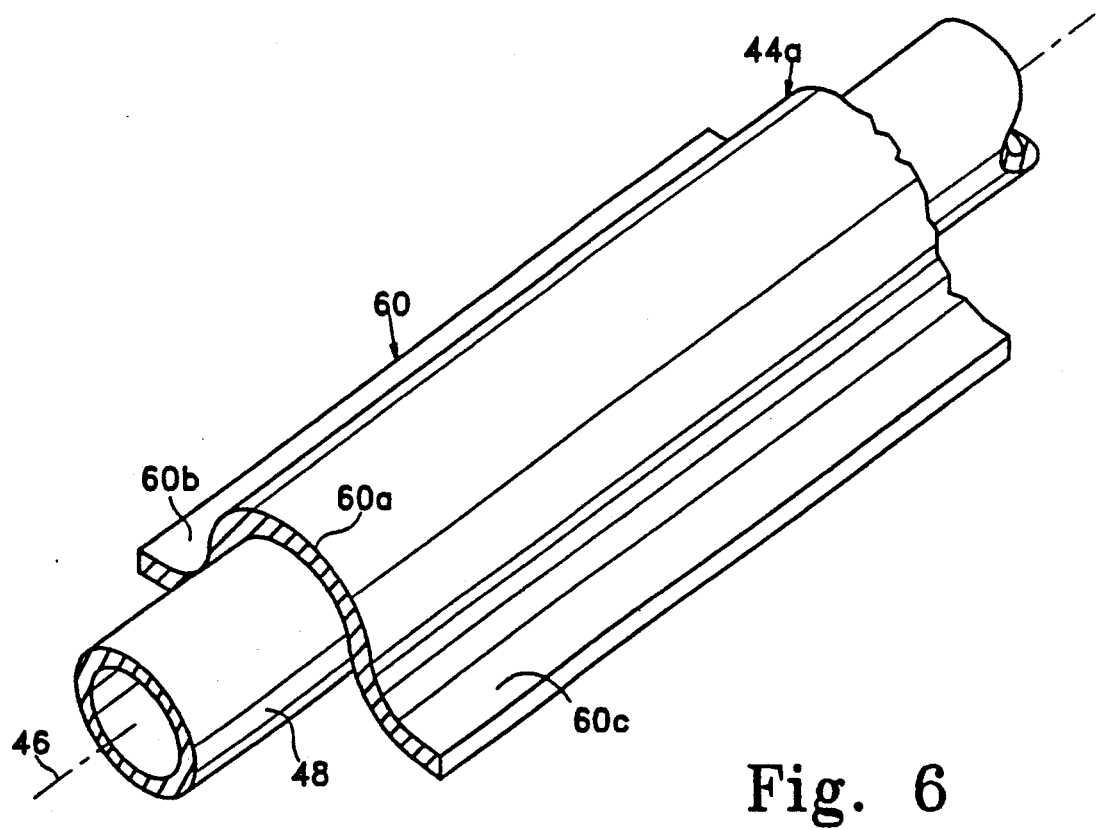
FIG. 6 is a perspective view of a portion of the damper illustrated in FIG. 5.

Illustrated in FIGS. 5 and 6 is a second embodiment of the damper, designated 44a which includes a spring tab 60 formed integrally with the tube 48 which also extends radially between the casing 32 and the hub 34 preferably for the entire radial extent of the tube 48 inside the strut 36 like the damper 44 shown in FIG. 2. The spring tab 60 is configured on the tube 48 for contacting at least one of the strut first and second sidewalls 38, 40 in compression therewith inside the strut passage 42 for effecting sliding friction to dampen vibration of the strut 36 during operation of the engine 10. As shown more clearly in FIG. 6, the spring tab 60 preferably includes an arcuate base 60a integrally joined to the tube 48, by a conventional adhesive or by being integrally manufactured therewith for example, and the base 60a partially surrounds the tube 48 for a portion of its circumference, which in the embodiment illustrated in FIGS. 5 and 6 is about 180°. The tab 60 further includes integral first and second oppositely extending wings 60b and 60c, respectively, which extend radially away from the tube 48 relative to the damper centerline axis 46, with the first and second wings 60b, 60c being disposed in compression contact with at least one of the strut first and second sidewalls 38, 40 as shown in FIG. 5.

In the embodiment illustrated in FIG. 5, the spring tab 60 is generally hat-shaped in transverse section and the spring tab first and second wings 60b, 60c are both disposed in contact with only one of the strut first and second sidewalls 38, 40, for example the second sidewall 40. And, the spring tab base 60a is disposed in contact with the other of the first and second sidewalls, i.e. the first sidewall 38. In this way, at least three lines of contact are provided between the spring tab 60 and the first and second sidewalls 38, 40 for providing sliding friction to dampen vibration of the strut 36. As shown in FIG. 5, the bottom of the tube 48 itself may additionally contact the second sidewall 40 for providing yet another, or fourth, line of contact for promoting friction damping.

Figure 7:
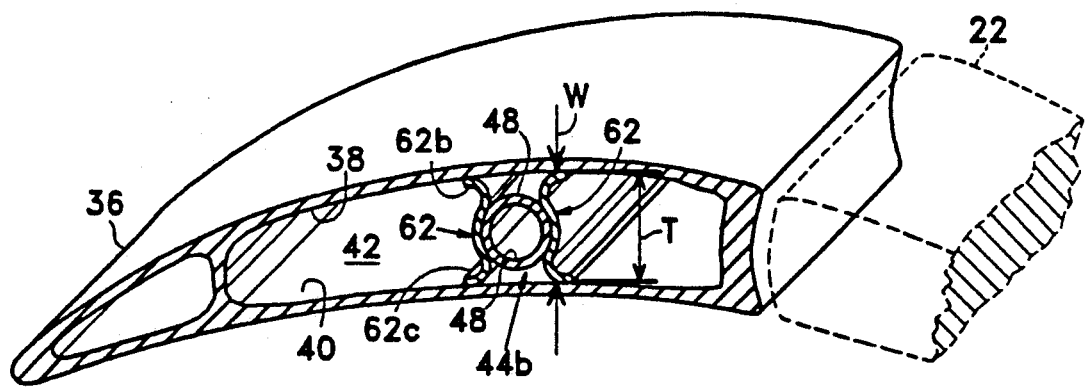
FIG. 7 is a partly sectional view similar to FIG. 3 illustrating a damper in a frame strut in accordance with a third embodiment of the present invention.
Figure 8:
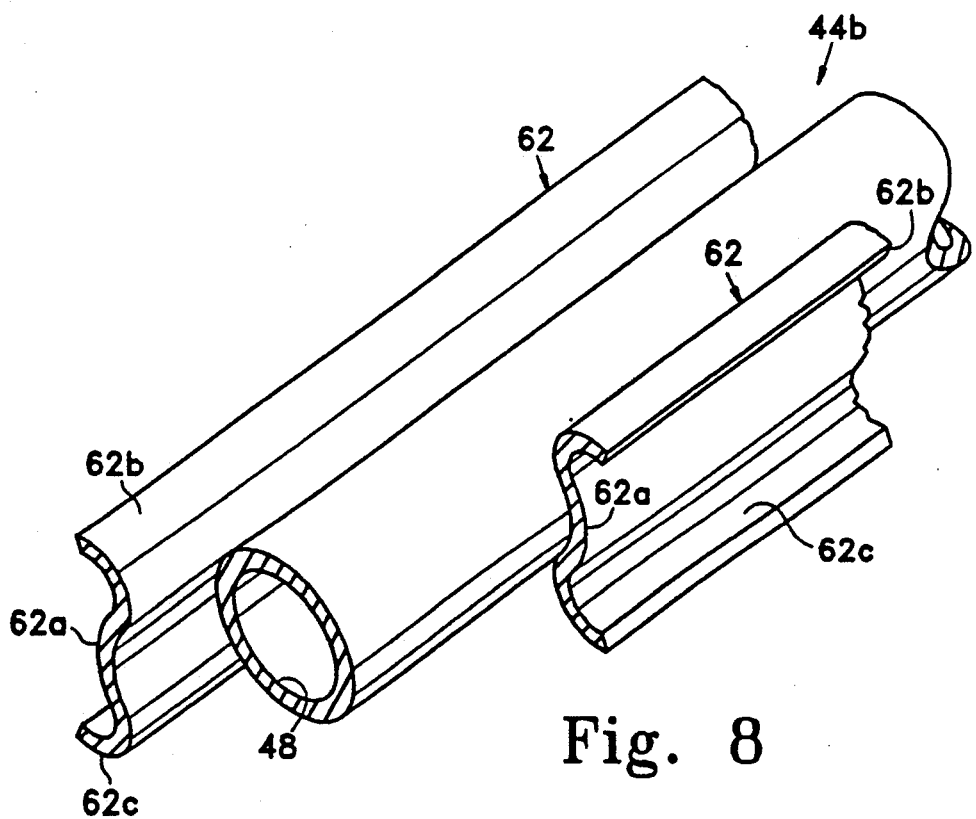
FIG. 8 is a perspective view of a portion of the damper illustrated in FIG. 7.

Illustrated in FIGS. 7 and 8 is another, third embodiment of the damper, designated 44b, including a pair of substantially identical spring tabs 62 each being generally W-shaped in transverse section, with an arcuate base 62a and generally radially outwardly extending in transverse section, with an arcuate base 62a and generally radially outwardly extending first and second wings 62b and 62c. As shown in FIG. 7, each of the first and second wings 62b and 62c of the pair of spring tabs 62 is disposed in contact with the strut first and second sidewalls 38, 40, respectively. With the spring tabs 62 being disposed on opposite sides of the damper tube 48 inside the strut passage 42, and the respective first and second wings 62b and 62c contacting the respective strut first and second sidewalls 38, 40, four lines of contact therewith are provided for effecting sliding friction damping during operation of the engine 10.

In both the second and third embodiments of the damper 44a, and 44b, the respective tabs 60, 62 are integrally joined to the center tube 48 by suitable adhesive or other bond, for example. The tubes 48 in the second and third embodiments may be identical to the multi-ply tube illustrated in FIG. 4, with the spring tabs 60, 62 themselves also being formed of a composite material having fibers 54 in a matrix 56. The overall thickness T of the dampers 48a, and 48b as illustrated in FIGS. 5 and 7, respectively, have initial values which are suitably larger than the width W of the strut passage 42 so that the desired interference fit therein may be effected. In FIG. 5, the thickness T of the damper 44a is measured across its base 60a and the wings 60b and 60c. And in the damper 44b illustrated in FIG. 7, the thickness T is measured across the opposite first and second wings 62b and 62c of each damper 44b.

FIGS. 4, 6, and 8 illustrate various configurations of the damper 44, and other variations are also within the scope of the present invention for ensuring effective elastic support and compression of the dampers 44 between the strut sidewalls 38, 40 for ensuring continuous contact therebetween for effective sliding friction damping of the strut 36, as well as damping due to the inherent composite configuration of the damper 44 itself.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A frame for a gas turbine engine comprising:
an annular outer casing;
an annular inner hub spaced radially inwardly from said outer casing;
a plurality of circumferentially spaced apart struts extending radially between said casing and said hub and fixedly joined thereto, each of said struts having spaced apart first and second sidewalls defining a strut passage extending radially between said casing and said hub; and
a plurality of elongate dampers, each damper being disposed in a respective one of said strut passages and extending radially between said casing and said hub, and each damper being disposed in an interference fit laterally between said first and second sidewalls for maintaining contact therewith for effecting sliding friction to dampen vibration of said struts;
wherein said damper is configured in the form of a single tube having an internal passage, said tube contacting each of said first and second sidewalls.

2. A frame according to claim 1 wherein said damper has a longitudinal centerline axis, and contacts said first and second sidewalls along at least two lines of contact extending substantially parallel to said damper centerline axis.

3. A frame for a gas turbine engine comprising:
an annular outer casing;
an annular inner hub spaced radially inwardly from said outer casing;
a plurality of circumferentially spaced apart struts extending radially between said casing and said hub and fixedly joined thereto, each of said struts having spaced apart first and second sidewalls defining a strut passage extending radially between said casing and said hub; and
a plurality of elongate dampers, each damper being disposed in a respective one of said strut passages and extending radially between said casing and said hub, and each damper being disposed in an interference fit laterally between said first and second sidewalls for maintaining contact therewith for effecting sliding friction to dampen vibration of said struts;
wherein said damper has a longitudinal centerline axis, and contacts said first and second sidewalls along at least two lines of contact extending substantially parallel to said damper centerline axis;
wherein said damper is configured in the form of a tube having an internal passage;
wherein said damper is cylindrical.

4. A frame according to claim 3 wherein said damper includes a spring tab integral with said tube and extending radially between said casing and said hub, said spring tab contacting at least one of said strut first and second sidewalls in compression therewith for effecting sliding friction to dampen vibration of said strut.

5. A frame according to claim 4 wherein said spring tab has a base integrally joined to said tube and at least partially surrounding said tube, and integral first and second wings extending radially away from said tube, said first and second wings being disposed in compression contact with at least one of said strut first and second sidewalls.

6. A frame according to claim 5 wherein said spring tab first and second wings are both disposed in contact with only one of said strut first and second sidewalls, and said spring tab base is disposed in contact with the other of said strut first and second sidewalls.

7. A frame according to claim 5 wherein said spring tab first and second wings are disposed in contact with said strut first and second sidewalls, respectively.

8. A frame according to claim 7 further including a pair of said spring tabs disposed on opposite sides of said damper tube, and respective first and second wings thereof contact said strut first and second sidewalls at four lines of contact.

9. A frame according to claim 2 wherein said damper is a composite member having a plurality of concentric plies of structural fibers joined together in a bonding matrix, wherein an outer one of said plurality of concentric plies of structural fibers contacts each of said first and second sidewalls.

* * * * *